(12) United States Patent
Goto et al.

(10) Patent No.: US 7,075,679 B2
(45) Date of Patent: Jul. 11, 2006

(54) IMAGE PROCESSING APPARATUS AND METHOD, AND PRINTING METHOD AND APPARATUS

(75) Inventors: Fumihiro Goto, Kanagawa (JP); Akitoshi Yamada, Kanagawa (JP); Tetsuya Suwa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 929 days.

(21) Appl. No.: 09/988,423

(22) Filed: Nov. 20, 2001

(65) Prior Publication Data

US 2002/0063898 A1 May 30, 2002

(30) Foreign Application Priority Data

Nov. 30, 2000 (JP) ............................. 2000-365940
Dec. 26, 2000 (JP) ............................. 2000-395851
Nov. 1, 2001 (JP) ............................. 2001-336814

(51) Int. Cl.
*H04N 1/40* (2006.01)

(52) U.S. Cl. ................... 358/3.01; 358/3.23; 358/523

(58) Field of Classification Search ............... 358/3.23, 358/523, 1.9, 3.01, 3.06; 382/232, 237, 251
See application file for complete search history.

(56) References Cited

U.S. PATENT DOCUMENTS

| 4,313,124 | A |  | 1/1982 | Hara ....................... 346/140 R |
| 4,345,262 | A |  | 8/1982 | Shirato et al. .......... 346/140 R |
| 4,459,600 | A |  | 7/1984 | Sato et al. .............. 346/140 R |
| 4,463,359 | A |  | 7/1984 | Ayata et al. ................ 346/1.1 |
| 4,558,333 | A |  | 12/1985 | Sugitani et al. ......... 346/140 R |
| 4,723,129 | A |  | 2/1988 | Endo et al. .................. 346/1.1 |
| 4,740,796 | A |  | 4/1988 | Endo et al. .................. 346/1.1 |
| 6,072,906 | A | * | 6/2000 | Sato ........................... 382/237 |

FOREIGN PATENT DOCUMENTS

| JP | 59-123670 | 7/1984 |
| JP | 59-138461 | 8/1984 |
| JP | 6-6357 | 1/1994 |

\* cited by examiner

*Primary Examiner*—Thomas D. Lee
(74) *Attorney, Agent, or Firm*—Fitzpatrick, Cella, Harper & Scinto

(57) ABSTRACT

An input correction unit divides entered multilevel image data into pixel blocks each comprising a plurality of pixels, refers to conversion tables having conversion data corresponding to pixel positions in each pixel block and converts each item of pixel data of each pixel block, into data corresponding to corresponding pixel data in the pixel block. The conversion data of each of the conversion tables is set in such a manner that an average value of the data in each pixel block converted by the input correction unit, takes on a value that is based on the pixel data within the pixel block obtained by division.

23 Claims, 14 Drawing Sheets

INPUT GAMMA CORRECTION

LUMINANCE-DENSITY CONVERSION

FIG. 7A
FIG. 7B
FIG. 7C
| b | c |
|---|---|
| d | e |

| | 12 | 13 | 14 | 15 | |
|---|---|---|---|---|---|
| ... | 6 | 6 | 7 | 7 | ... |

OUTPUT CORRECTION TABLE f

| | | | | | | |
|---|---|---|---|---|---|---|
| ... | 6 | 7 | 7 | 8 | ... | OUTPUT CORRECTION TABLE g |
| ... | 6 | 6 | 7 | 7 | ... | OUTPUT CORRECTION TABLE h |
| ... | 6 | 6 | 6 | 7 | ... | OUTPUT CORRECTION TABLE i |
| ... | 6 | 7 | 7 | 7 | ... | OUTPUT CORRECTION TABLE j |
| ... | 6.00 | 6.50 | 6.75 | 7.25 | ... | AVERAGE VALUES |

□ USE OUTPUT CORRECTION TABLE f

▨ USE OUTPUT CORRECTION TABLE g
▧ USE OUTPUT CORRECTION TABLE h
▨ USE OUTPUT CORRECTION TABLE i
▧ USE OUTPUT CORRECTION TABLE j

FIG. 11A

|   |   |   |   |
|---|---|---|---|
| 0 | 0 | 0 | 0 |
| 0 | 0 | 0 | 0 |
| 1 | 1 | 1 | 1 |
| 1 | 1 | 1 | 1 |

FIG. 11B

|   |   |   |   |
|---|---|---|---|
| 0 | 0 | 1 | 0 |
| 0 | 0 | 0 | 1 |
| 1 | 1 | 1 | 1 |
| 0 | 1 | 1 | 1 |

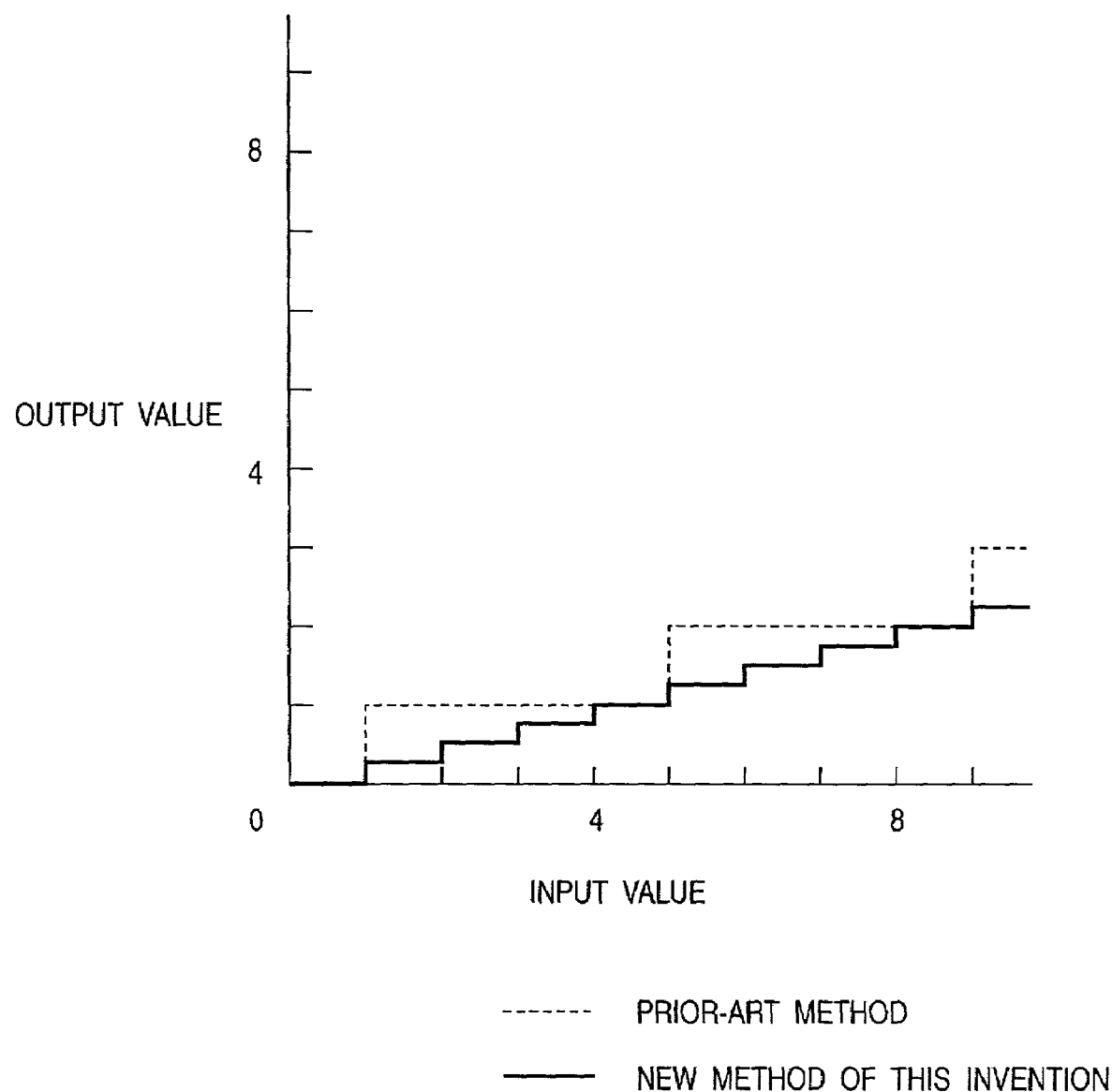

IMAGE PROCESSING APPARATUS AND METHOD, AND PRINTING METHOD AND APPARATUS

FIELD OF THE INVENTION

This invention relates to an image processing apparatus and method for inputting and processing multilevel image data, and to a printing method and apparatus for generating print data from this multilevel image data and printing the print data.

BACKGROUND OF THE INVENTION

When an image signal expressed by RGB signals, which are luminance signals, is entered and printed by a color printer, the image data must be converted to CMYK signals, which are density signals. When such a color conversion is made, color tones are corrected in such a manner that the original image represented by the RGB signals and the image as outputted by the printer, which of course must be printed using only those colors that are reproducible by the color printer, will have similar tones. Furthermore, the CMYK signals corresponding to the original image signal are subjected to an output correction in such a manner that the density value of the image printed by the color printer will exhibit a linear relationship with respect to the CMYK signals. Each item of CMYK data thus obtained and represented by multilevel data is quantized to reduce the number of tones to that capable of being printed by the color printer.

Since the conversion equations used in such color conversion are high-order equations, the computations take a long time. For this reason, the general practice is to retain pre-calculated values in table form and perform the color conversion by referring to the table. If such a table is used, the input values thereto are discrete values represented by, e.g., eight bits each. As a consequence, the color conversion is not of the linear continuous type, and the actual output values include error.

In the conventional color printer, deterioration of the image due to accumulation of such error is almost negligible in the actually printed image because the printer resolution and reproducible tonality are only moderately high. However, in images printed by the latest high-resolution, high-tonality color printers, such error affects the quality of the image and is no longer negligible.

The present invention has been devised in view of the prior art described above, and its object is to provide an image processing apparatus and method for dividing entered multilevel image data into pixel blocks each composed of a plurality of pixels, and generating image data, which conforms to the entered multilevel image data, on a per-pixel-block basis.

Another object of the present invention is to provide an image processing apparatus and method in which, when multilevel image data is converted using a table, the converted image data, which conforms to an input value, can be obtained in units of pixel blocks of the entered multilevel image data.

According to the present invention, the foregoing objects are attained by providing an image processing apparatus for processing multilevel image data. That apparatus comprises dividing means for dividing the multilevel image data into pixel blocks each comprising a plurality of pixels. Conversion tables, each containing a plurality of items of conversion data, are provided, each item in which corresponds to a pixel position in each pixel block obtained by operation of the dividing means. Conversion means refer to the conversion tables to convert multi-level image data of a pixel of each pixel block into (new, or converted) data corresponding to that pixel, and quantization means quantize the resulting data. Each item of the conversion data of each conversion table has been set in such a manner that an average value of the data corresponding to the pixel in the pixel block converted by the conversion means, takes on a value that is based on the multilevel image data within the block.

Further, according to the present invention, the foregoing objects are attained by providing an image processing method for applying image processing to multilevel image data applied as an input. That method comprises dividing the multilevel image data into pixel blocks each comprising a plurality of pixels. Conversion tables, each containing a plurality of items of conversion data, are provided, each item in which corresponds to a pixel position in each pixel block. Those conversion tables are referred to, to convert multi-level image data of a pixel of each pixel block into (new, or converted) data corresponding to that pixel, and quantization means quantize the resulting data. Each item of the conversion data of each conversion table has been set in such a manner that an average value of the data corresponding to the pixel in the pixel block after conversion, takes on a value that is based on the multilevel image data within the block.

Other features and advantages of the present invention will be apparent from the following description taken in conjunction with the accompanying drawings, in which like reference characters designate the same or similar parts throughout the figures thereof.

The accompanying drawings, which are incorporated in and constitute a part of the specification, illustrate an embodiment of the invention and, together with the description, serve to explain the principles of the invention.

Figure 8:
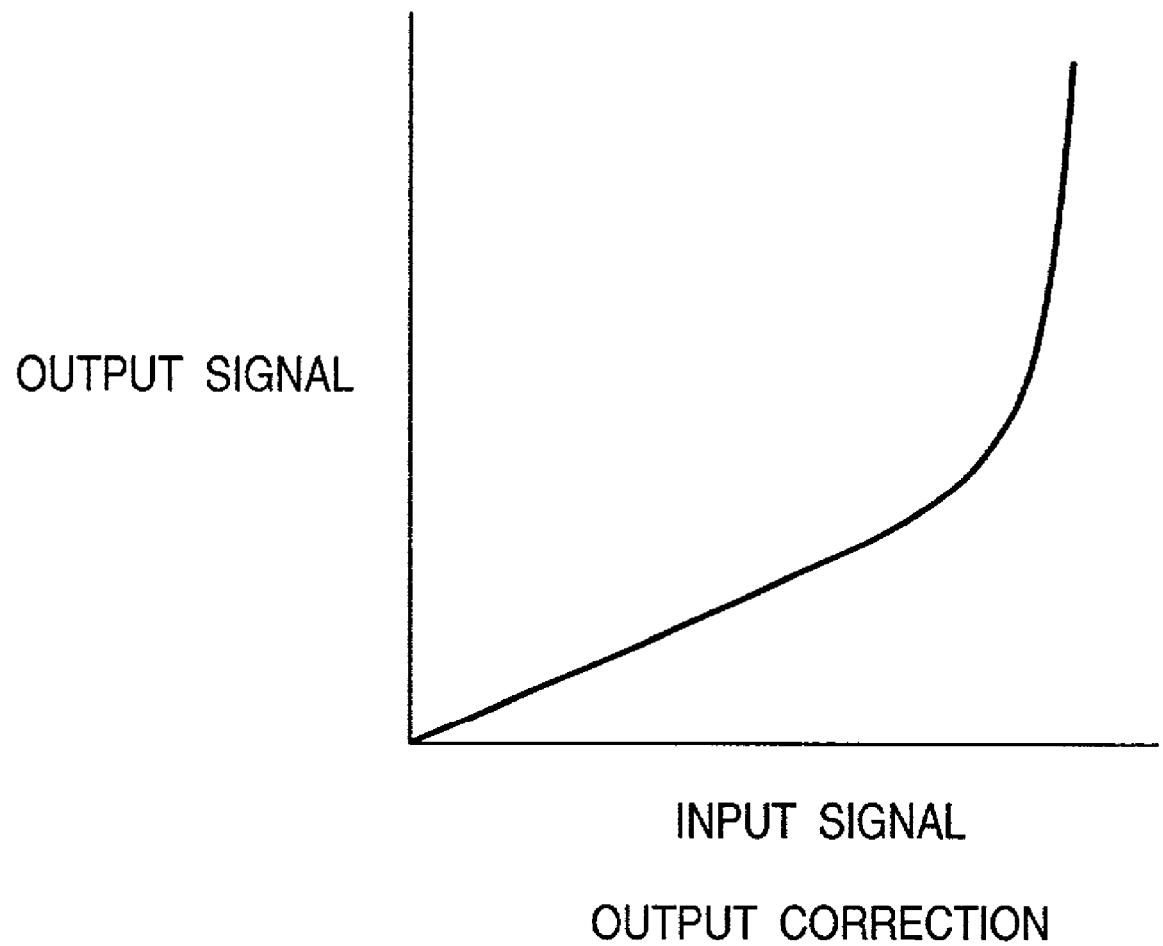
Figures 9A, 9B:
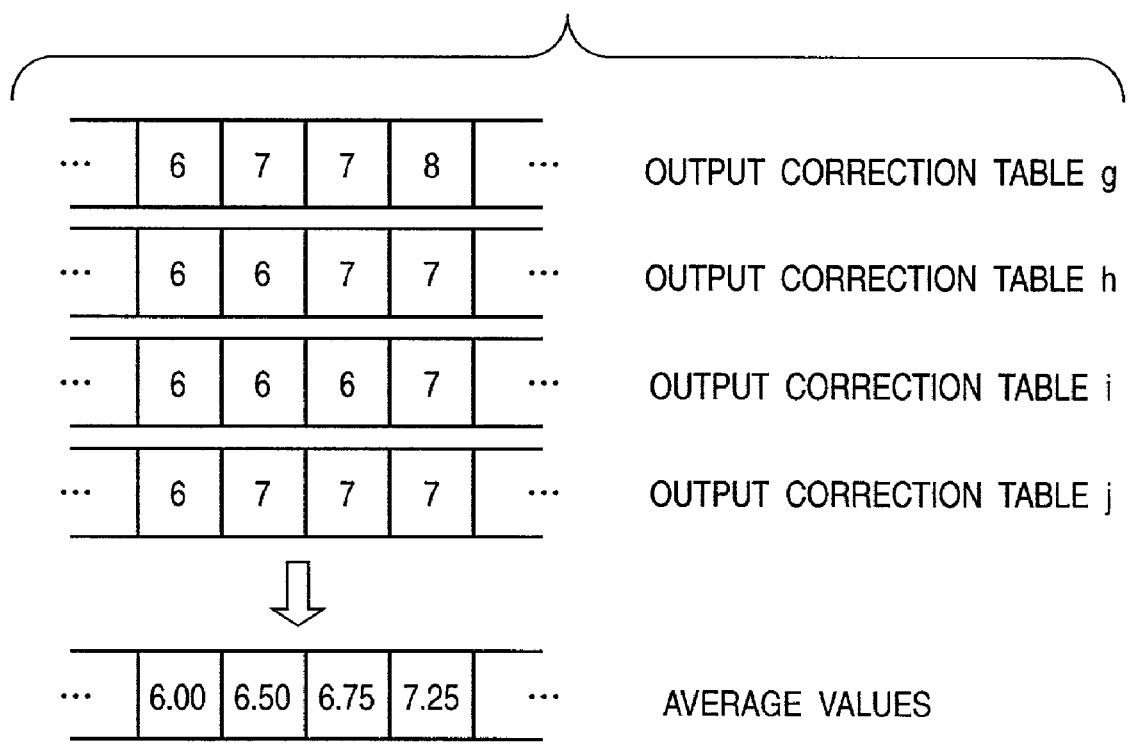
Figure 10A:
Figure 10B:
Figure 13:
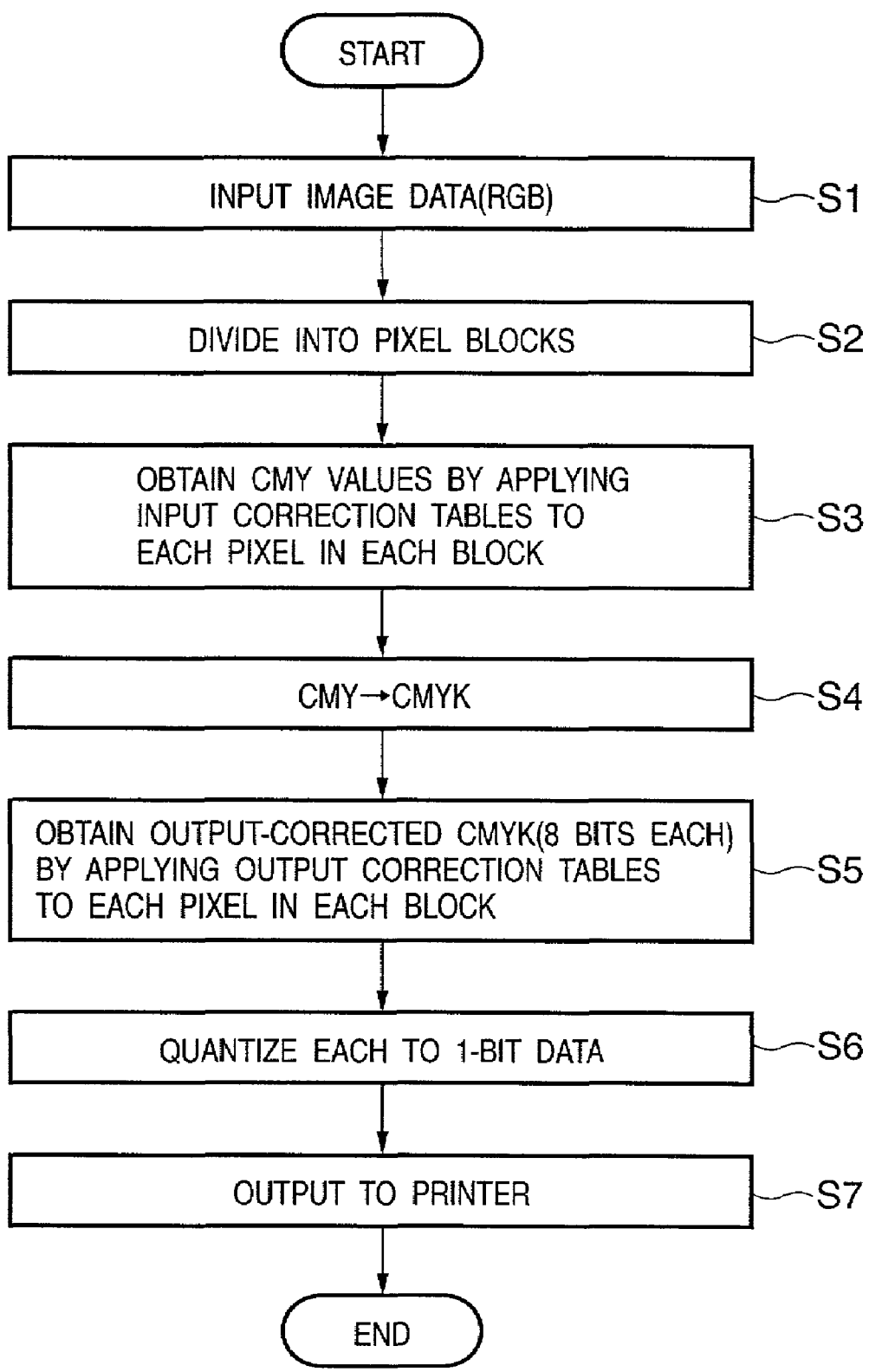
Figure 14:
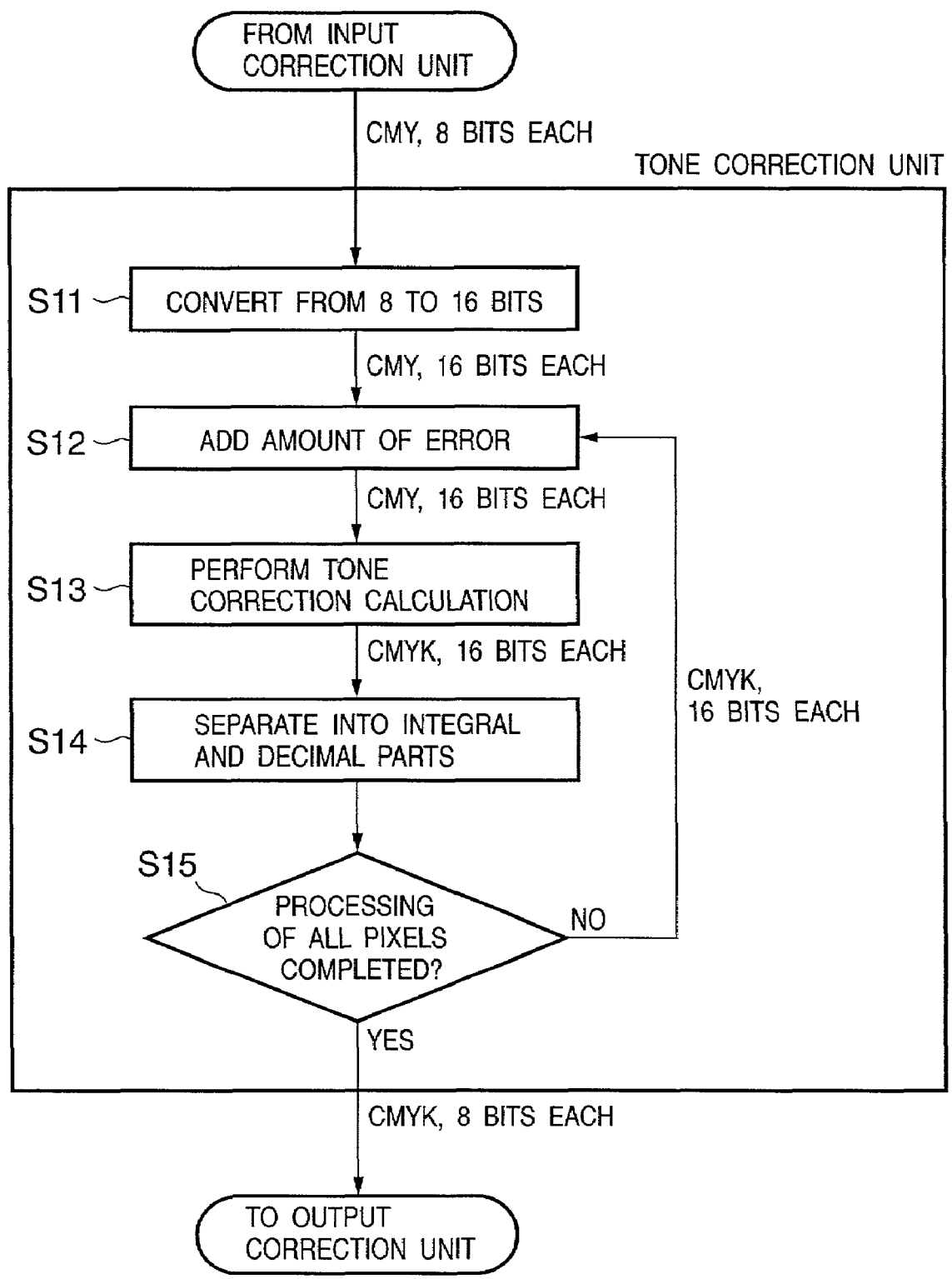

FIGS. 7A, 7B and 7C are diagrams useful in describing a specific example of an input correction according to this embodiment and an example of the prior art, in which FIG. 7A illustrates an example of input correction according to the prior art, FIG. 7B illustrates a specific example of input correction according to this embodiment, and FIG. 7C is a diagram useful in describing the relationship between pixel positions and tables used;

FIG. 8 is a graph useful in describing the relationship between an input signal and an output signal according to this embodiment;

FIGS. 9A and 9B are diagrams useful in describing a comparison between a specific example of output correction according to this embodiment and an example of the prior art;

FIGS. 10A and 10B are diagrams useful in describing a specific example of an output correction according to this embodiment and an example of the prior art;

FIGS. 11A and 11B are diagrams useful in describing a comparison between a specific example of results of quantization according to this embodiment and an example of the prior art;

FIG. 12 is a diagram useful in describing effects of an input correction and output correction according to this embodiment;

FIG. 13 is a flowchart useful in describing image processing in a printer driver according to this embodiment; and FIG. 14 is a flowchart useful in describing processing in a tone correction unit according to another embodiment of the present invention.

First, the features of the image processing method and apparatus according to the preferred embodiments of the present invention will be described in brief.

A block of input image data consisting of a plurality of pixels is adopted as a unit of which the tone is capable of being expressed, each of the plurality of items of pixel data constituting the unit is converted and the respective items of converted data are obtained in correspondence to respective pixel data of the unit. An average value of these items of converted data in one unit is set so as to be different from the average value of other units in a case where the value (input value) of the pixel block comprising the original plurality of pixels is different from that of other pixel blocks. The data thus obtained by the conversion is then quantized to values (C, M, Y and K components each represented by one bit, by way of example) conforming to the number of tones producible by the color printer, and these values are sent to the printer so that they may be used in printing.

In order to achieve this, input correction (conversion) tables corresponding to positions of respective ones of the plurality of pixels constituting the single unit (pixel block) are provided, and each item of pixel data within the single unit is converted using these input correction tables, whereby an image having a high tonality closer to that of the original image data can be printed.

The image processing apparatus and method according to this embodiment may be implemented by a printer driver or the like installed in a host computer which generates print data output to a color printing apparatus such as an ink-jet printer. Alternatively, the apparatus and method may be implemented within a color printing apparatus of this type. The present invention is applicable not only to a printing apparatus such as a color printer but also to a high-resolution display or other image output apparatus as well as other image processing systems in which multilevel image data is processed to change the number of tones.

Preferred embodiments of the present invention will be described with reference to the drawings. In the description that follows, it is assumed that image processing according to this embodiment is implemented by a printer driver installed in a host computer. However, the present invention is not limited to such an arrangement.

Figure 1:
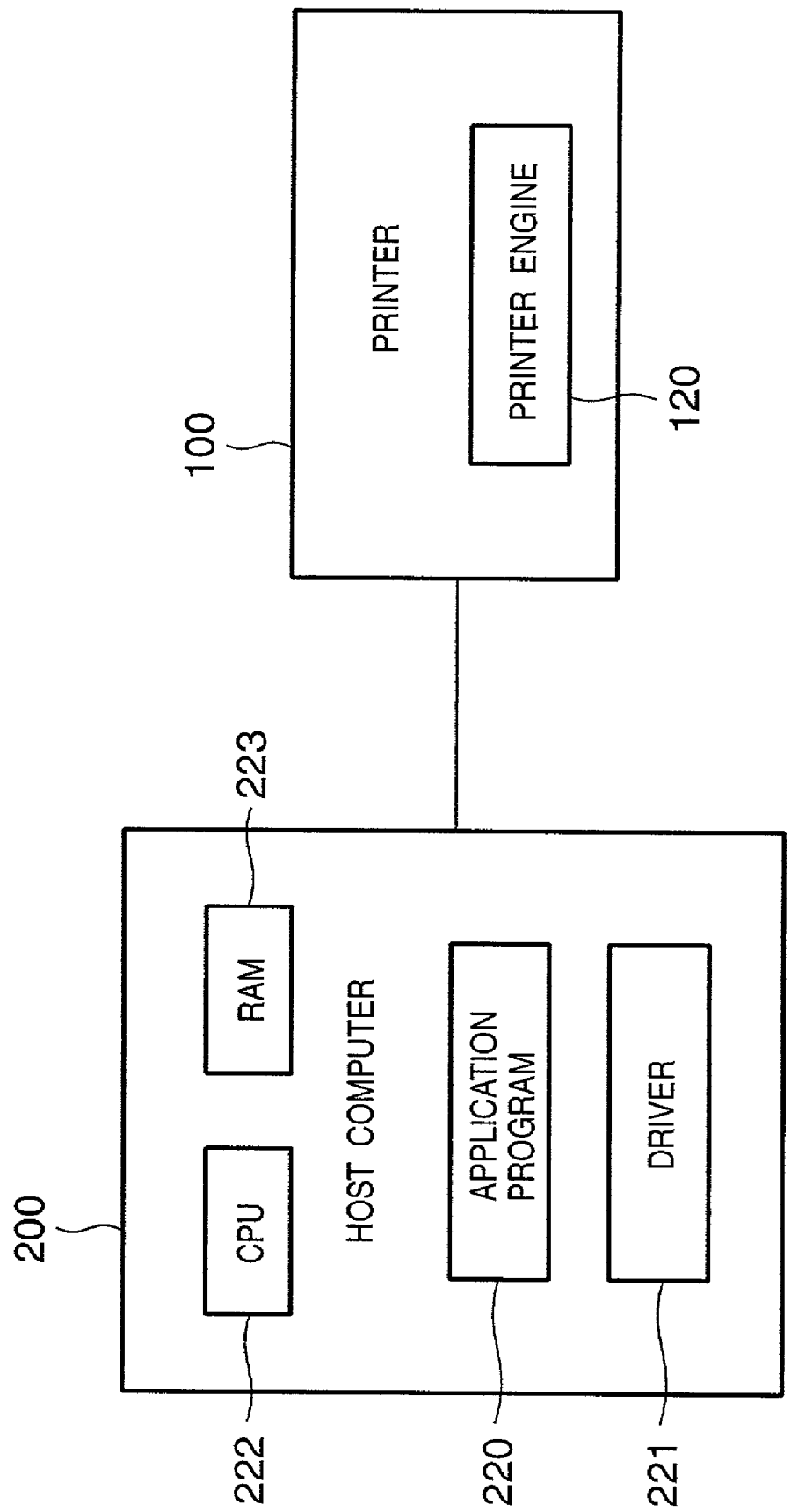
FIG. 1 is a block diagram illustrating the structure of an ink-jet printing system according to an embodiment of the present invention.

FIG. 1 is a block diagram illustrating the general structure of an ink-jet printing system according to this embodiment.

As shown in FIG. 1, the system includes an ink-jet printer 100 according to this embodiment. The printer 100 includes a printer engine 120 for printing an image according to the ink-jet method. The printer engine 120, which is that of a color printer, has a plurality of ink-jet heads that discharge ink corresponding to each of the colors of CMYK. These ink-jet heads are scanned back and forth to print an image on a sheet of printing material. The structure of ink-jet printer 100 will be described later in detail with reference to FIGS. 3 and 4.

The system further includes a host computer 200 in which various application programs 220 and a printer driver 221 for the ink-jet printer 100 are stored on a hard disk, not shown. The image processing method according to this embodiment may be implemented by the ink-jet printer 100 or by the printer driver 221. The printer driver 221 is provided by the maker of the inkjet printer 100 in the form of a storage medium such as a CD-ROM and is installed on the hard disk of the host computer 200. When the printer driver 221 is to be run, it is loaded into a RAM 223 of the host computer 200 and executed under the control of a CPU 222.

The printer 100 receives print data sent from the printer driver 221 and prints an image by a specified printing method such as the multipass method. The inkjet printer 100 has mask information for deciding dot positions at which printing is performed on each scan. Dot positions (nozzles and printed dot positions) at which printing is performed on each pass are decided in accordance with the mask information. It should be noted that the mask information may be provided in the host computer 200 and that the printer 100 may be adapted so as to simply print based upon print data that has been received from the host computer.

Figure 2:
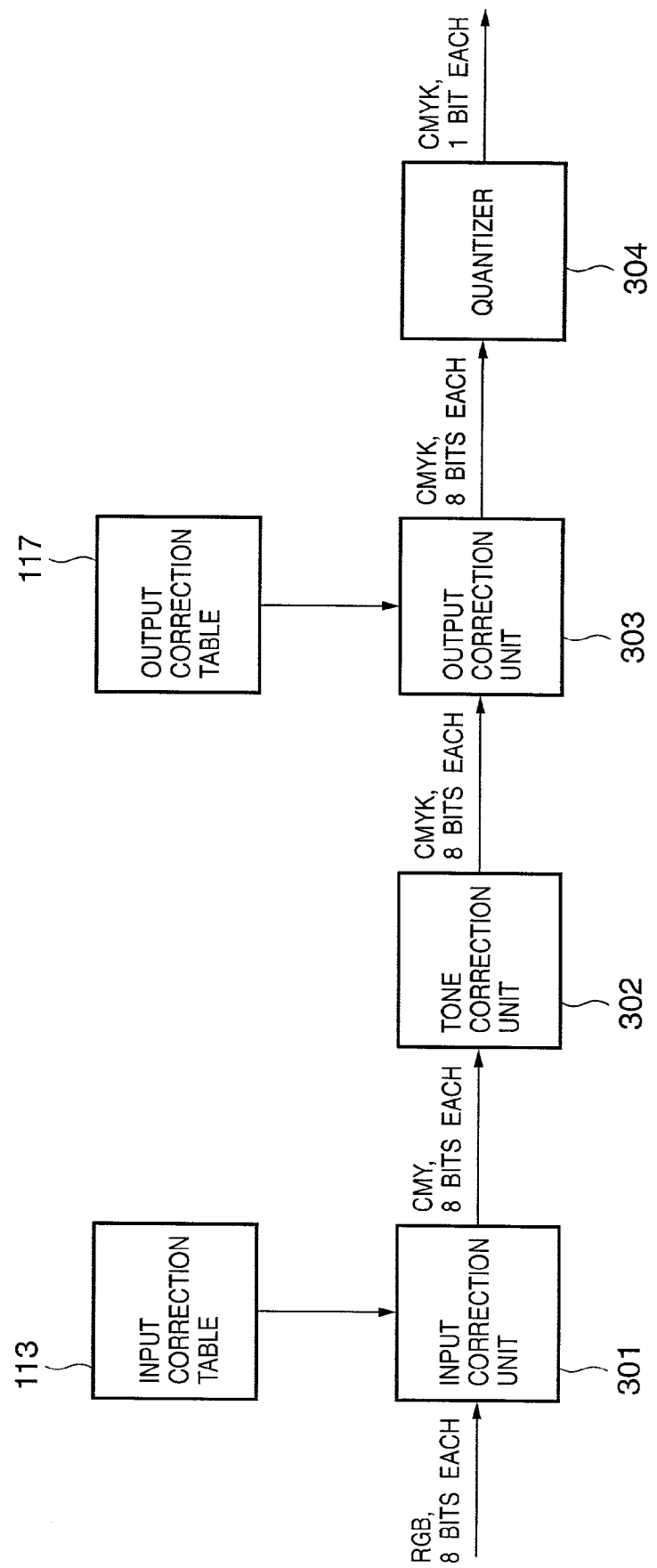
FIG. 2 is a functional block illustrating the structure of an image processing unit in a printer driver according to this embodiment.

FIG. 2 is a block diagram illustrating an arrangement useful in describing image processing in the printer driver 221 of this embodiment.

The arrangement of FIG. 2 includes an input correction unit 301 which inputs image data (luminance data), which is represented by R, G, B of eight bits each, from the application program 220, etc., refers to an input correction (conversion) table 113 and effects a conversion to, e.g., 8-bit data (density data) of each of C (cyan), M (magenta) and Y (yellow) used in printing. A tone correction unit 302 generates C, M, Y, K (black) data based upon the CMY data corrected by the input correction unit 301 and outputs the data thus generated. When printing is performed by the ink-jet printer 100, an output correction unit 303 decides the values of data to be printed on each pass, by referring to an output correction (conversion) table 117. Using, e.g., the error diffusion method, a quantizer 304 quantizes image data of eight bits of each of the components C, M, Y output from the output correction unit 303 and outputs 1-bit data (print data) for each of C, M, Y, K, which is the result of quantization.

Figure 3:
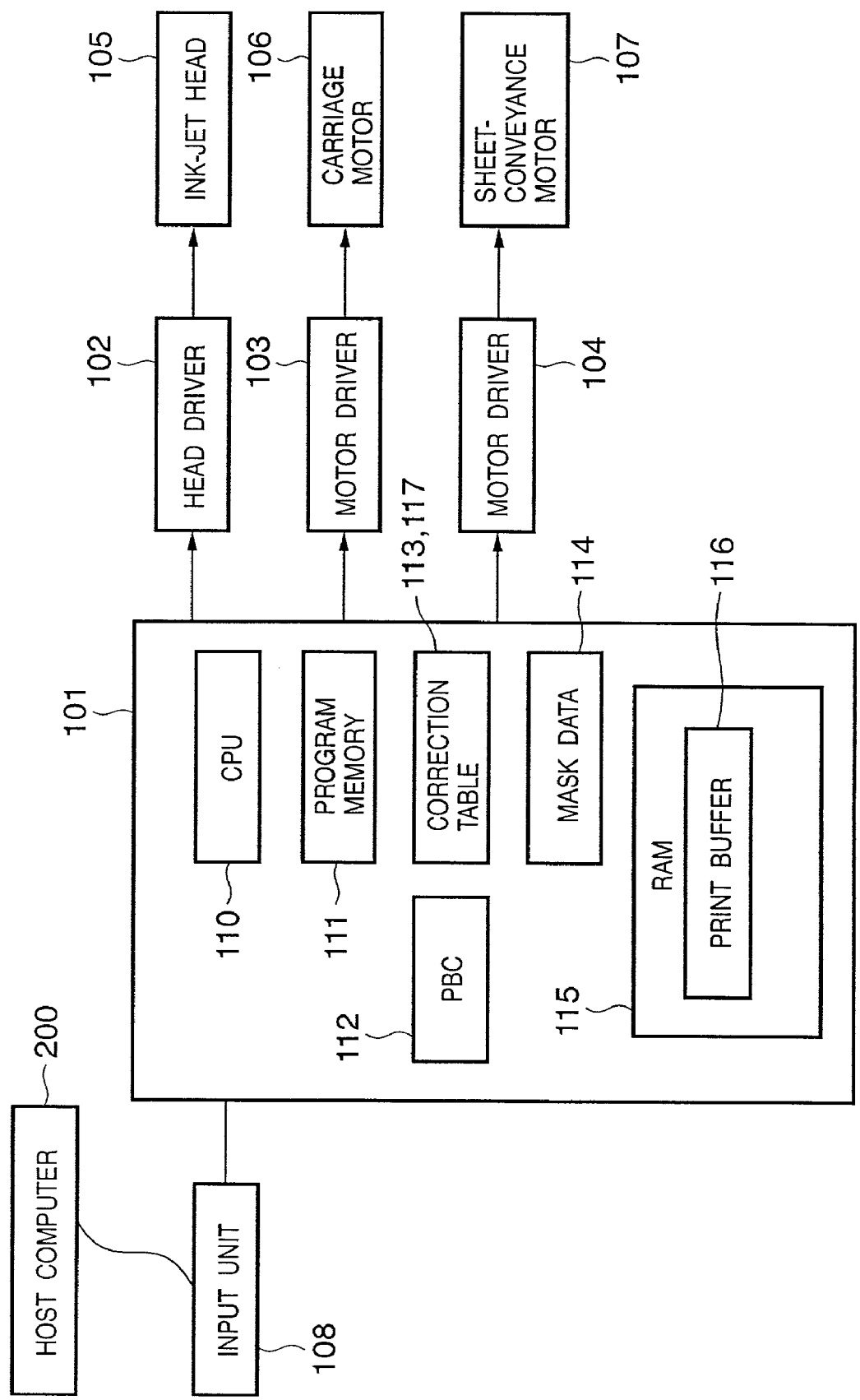
FIG. 3 is a block diagram illustrating the structure of an ink-jet printing system according to an embodiment of the present invention.

FIG. 3 is a block diagram showing the basic structure of the ink-jet printer 100 according to an embodiment of the present invention.

The printer includes a controller 101 for controlling the overall operation of the ink-jet printer according to this embodiment. A head driver 102 performs printing by driving an ink-jet head 105 based upon print data from the controller 101. Motor drivers 103, 104 drive corresponding carriage and sheet-feed motors 106, 107, respectively. An input unit 108 receives an input of image data from an external device such as the host computer 200 and supplies the image data to the controller 101.

As for the structure of the controller 101, the latter includes a CPU such as a microprocessor, a program memory 111 for storing a program executed by the CPU 110, and a RAM 115 having a work area, which stores various data when the CPU 110 operates, and a print buffer 116 for storing print data. The controller 101 further includes a print buffer controller (PBC) 112, which exercises control so as to extract print data, which is to be printed, from the print buffer 116; the input and output correction tables 113, 117; and mask data 114 used to decide data to be printed when the ink-jet head 105 is scanned. In a case where the above-described processing is executed by the printer driver 221, the correction tables 113, 117 need not be provided in the ink-jet printer 100.

Figure 4:
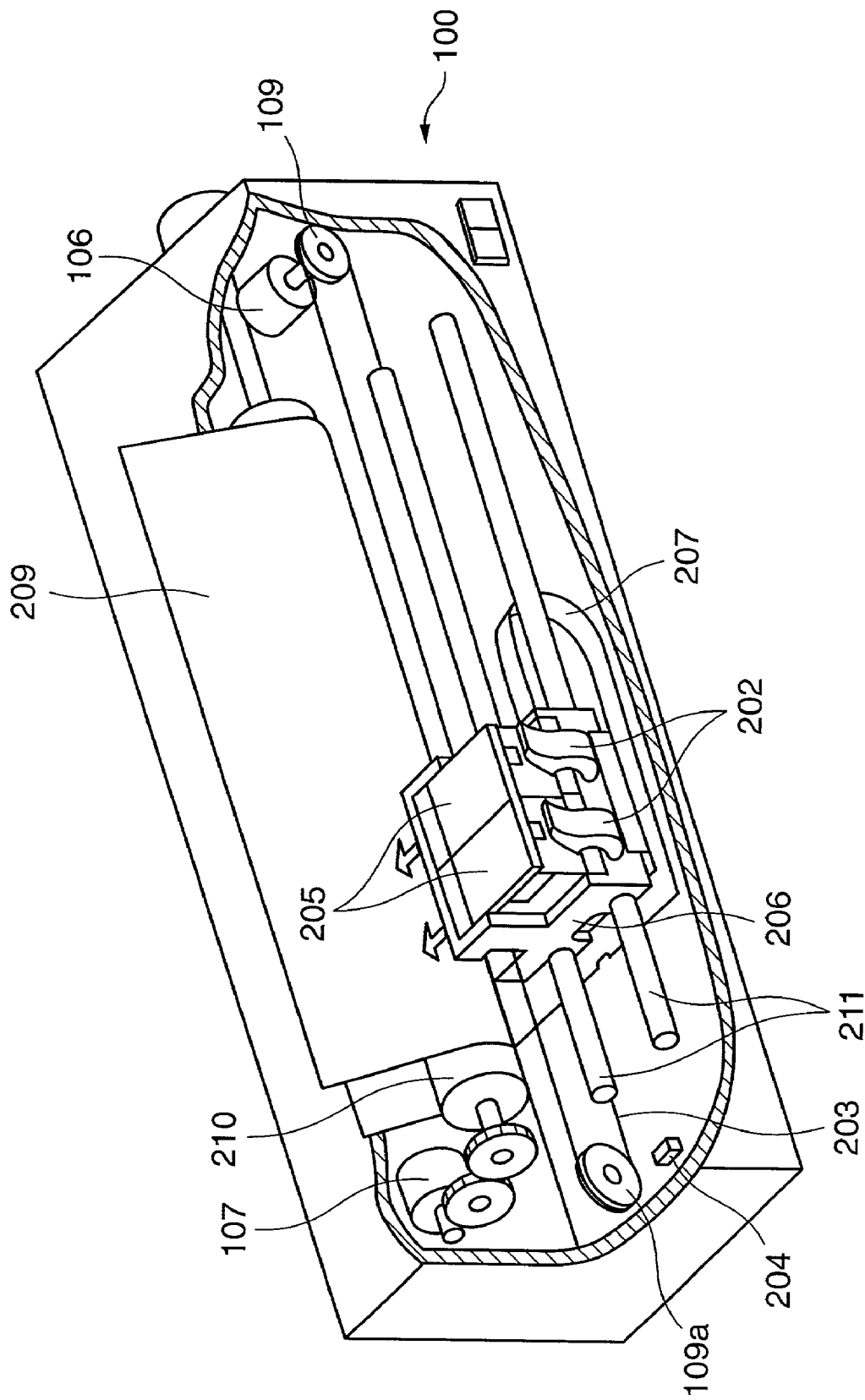
FIG. 4 is a perspective view illustrating the structure of the printing section of a serial-type inkjet printer according to this embodiment.

FIG. 4 is a diagram useful in describing the structure of the printing section of the ink-jet printer 100 according to this embodiment of the present invention.

As shown in FIG. 4, a head cartridge 205 is obtained by integrating an ink-jet head (105 in FIG. 3) and an ink supply source. The head cartridge 205 is secured to a carriage 206 by a retaining member 202. The carriage 206 is mounted so as to be slidable along a shaft 211. A belt 203 is wound about a pulley 109, which is mounted on the rotary shaft of the carriage motor 106, and about another pulley 109a. Part of the belt 203 is secured to the carriage 206. As a result, the carriage 206 can be moved back and forth along the shaft 211 by rotating the carriage motor 106. The inkjet head 105 on head cartridge 205 is driven via the head driver 102 (see FIG. 3) in accordance with print data in sync with scanning of the carriage 206, thereby discharging ink that makes it possible to print a desired image on a printing sheet 209 wound about a platen 210 to form a printing surface. It should be noted that the platen 210 is driven into rotation by driving the sheet-feed motor 107.

Print data to be printed is supplied from the controller 101 to the head cartridge 205 via a cable 207 and a terminal connected thereto. The head cartridge 205 can be provided with one or a plurality of ink-jet heads depending on the colors of inks used. A home-position sensor 204 senses that the carriage 206 is at a home position.

Reference will be had to FIG. 5A to FIG. 7C to describe a specific example of processing for converting RGB image signals in the input correction unit 301 to CMY signals.

Figure 5A:
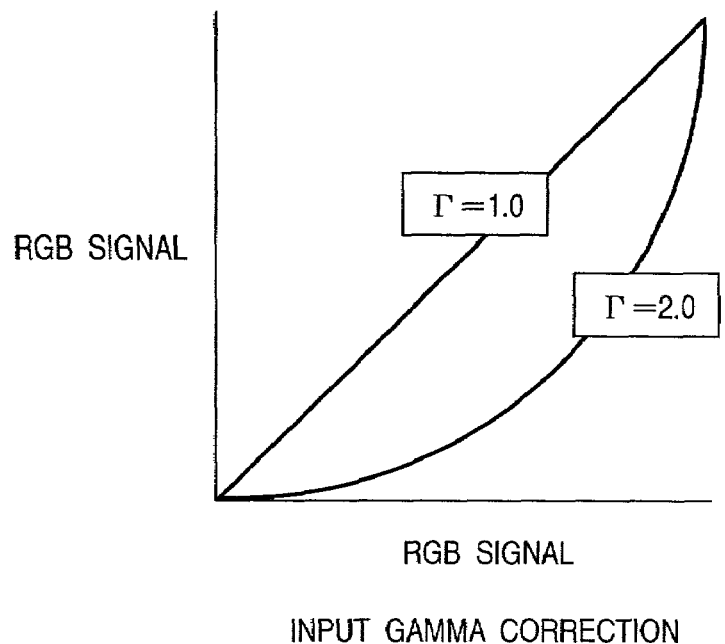
FIG. 5A is a graph useful in describing gamma correction of an RGB signal and FIG. 5B a graph useful in describing a luminance-to-density conversion.
Figure 5B:
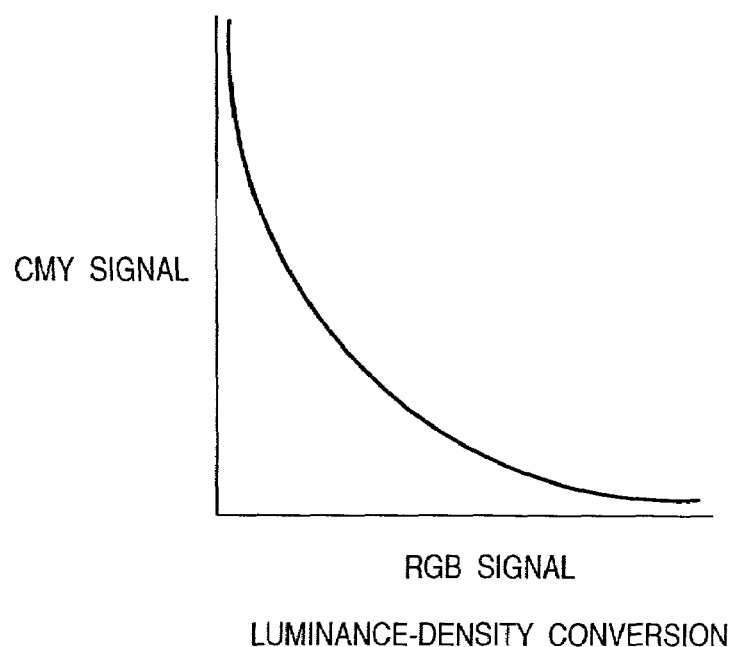

FIG. 5A is a graph useful in describing gamma correction of entered RGB signals, and FIG. 5B a graph useful in describing an example in which RGB signals are converted to CMY signals.

Figures 6A, 6B:
FIGS. 6A and 6B are diagrams useful in describing a comparison between an example of the prior art and this embodiment.

FIGS. 6A and 6B are diagrams useful in describing the difference between the conventional input correction and input correction of image data according to this embodiment.

FIG. 6A is a diagram useful in describing input correction using an input correction table according to the prior art, and FIG. 6B is a diagram useful in describing input correction using input correction tables b to e (which correspond to input correction table 113 mentioned above) according to this embodiment.

In FIG. 6A, input values "200", "199", "198" and "197" are converted to "12", "12", "13" and "13", respectively. Accordingly, even though the input values "199" and "200" are different from each other, the output values are both the same, i.e., "12". The same holds true when the input values are "197" and "198".

By contrast, in this embodiment, as shown in FIG. 6B, the different types of input correction tables (b to e) in correspondence to pixel positions in a pixel block are used, and each pixel data in each pixel block is converted each data in accordance with each pixel position of the pixel block, as a single unit consisting to a pixel block comprising 2×2 pixels.

Specific examples are illustrated in FIGS. 7A to 7C.

FIG. 7A is a diagram useful in describing a conventional input correction corresponding to FIG. 6A. This illustrates an example in which a block comprising 2×2 pixels of entered RGB data is adopted as one unit and the pixel block is converted using input correction table a. In this case, the values corresponding to each pixel block are converted to identical values regardless of the fact that the pixel data of the pixel blocks are different from one another, as shown in FIG. 6A.

By contrast, in FIG. 7B relating to this embodiment, the input correction tables (b to e) used in the correction become different depending upon the pixel positions in the pixel block, as illustrated in FIG. 7C. As a result, in a pixel block unit comprising 2×2 pixels, the output values corresponding to the input values take on values that differ from one another depending upon differences in the input values, as shown in FIG. 7B.

For example, compare FIGS. 7A and 7B. The average values of blocks 701 and 704, which correspond to the blocks in which all input pixel values are "200" and "197", respectively, do not change between FIGS. 7A and 7B. However, in the case of block 702 for which the input pixel values are all "199", the average value in FIG. 7A is "12" whereas the average value in FIG. 7B is "12.25". Further, in the case of block 703 for which the input pixel values are all "198", the average value in FIG. 7A is "13" whereas the average value in FIG. 7B is "12.75". As a result, in the case of FIG. 7B, it will be understood that the average values of the converted blocks have been converted to values conforming to respective ones of the input values "197" to "200".

A specific example of processing in the output correction unit 303 in which a CMYK signal is converted to data suited to the printer 100 will be described with reference to FIGS. 8 to 10B.

FIG. 8 is a graph illustrating the correction characteristic of output signal values (density data) versus input signal values (density data) in the output correction unit 303 according to this embodiment.

FIG. 9A is a diagram useful in describing an output correction using the conventional output correction table f, and FIG. 9B is a diagram useful in describing an output correction using output correction tables g to j (which correspond to the output correction table 117) according to this embodiment.

In FIG. 9A, input values "15", "14", "13" and "12" are converted to "7", "7", "6" and "6", respectively. Accordingly, even though the input values "14" and "15" are different from each other, the output values are both the same, i.e., "7". The same holds true when the input values are "12" and "13".

By contrast, in this embodiment, as shown in FIG. 9B, the different types of output correction tables (g to j) in correspondence to each pixel position of a pixel block are used, and each pixel data in each pixel block is converted in accordance with each pixel position in each pixel block, as a single unit constituting a pixel block comprising 2×2 pixels.

Specific examples are illustrated in FIGS. 10A and 10B.

FIG. 10A is a diagram useful in describing a conventional output correction corresponding to FIG. 9A. This illustrates an example in which a block comprising 2×2 pixels of entered CMYK data is adopted as one unit and the pixel block is converted using the output correction table f. In this case, the values corresponding to each pixel block are converted to identical values regardless of the fact that the input values are different from one another, as shown in FIG. 9A.

By contrast, in FIG. 10B relating to this embodiment, the output correction tables (g to j) used in the correction become different depending upon the pixel positions in the pixel block. As a result, in a pixel block unit comprising 2×2 pixels, the output values corresponding to the input values take on values that differ from one another depending upon differences in the input values, as shown in FIG. 10B.

For example, compare FIGS. 10A and 10B. The average values of blocks 801 and 804, which correspond to the blocks in which all input pixel values are "12" and "15", respectively, do not change between FIGS. 10A and 10B. However, in the case of block 802 for which the input pixel values are all "13", the average value in FIG. 10A is "6" whereas the average value in FIG. 10B is "6.50". Further, in the case of block 803 for which the input pixel values are all "14", the average value in FIG. 10A is "7" whereas the average value in FIG. 10B is "6.75". As a result, in the case of FIG. 10B, it will be understood that the average values of the converted blocks have been converted to values conforming to respective ones of the input values "12" to "15".

In the prior art, therefore, as illustrated by the dotted line in FIG. 12, there are instances where the output values are the same even in a case where the input values differ. By contrast, according to this embodiment as indicated by the solid line in FIG. 12, when the pixel block units each containing a plurality of pixels are considered, the output values are converted to values that differ from one another in accordance with each of the input values. In other words, according to the present embodiment, the number of tones to be reproducible can be increased as shown in FIG. 12, in comparison with the prior art.

FIGS. 11A and 11B are diagrams illustrating an example of results obtained by quantizing the CMYK data of FIGS. 10A and 10B, respectively. FIG. 11A illustrates the results of quantization corresponding to FIG. 10A according to the prior art, and FIG. 11B illustrates the results of quantization corresponding to FIG. 10B according to this embodiment. Here "7" has been adopted as the threshold value, so that values equal to or greater than "7" are converted (quantized) to "1" and values less than "7" are converted (quantized) to "0". The "1" data positions indicate pixel positions at which ink is printed by the ink-jet printer 100.

It will be understood by referring to FIGS. 10A, 10B and FIGS. 11A, 11B that even when the entered CMYK values are the same, this embodiment is more successful at distributing dots (data "1") conforming to the data values of each pixel block than in the prior art. In other words, data in an original pixel block is more reflected to an output image. As a result, FIG. 11B (embodiment) shows that more tones can be expressed in each pixel block in comparison with FIG. 11A (prior art).

As a result, the embodiment is advantageous in that it is possible to reproduce tones which were not reproduced in the prior art and to reproduce a high-quality image in which the tones of the original image are preserved.

Next, reference will be had to the flowchart of FIG. 13 to describe processing (image processing) for generating print data from input image data (RGB) by the printer driver 221 of this embodiment. It should be noted that this processing may be executed by the ink-jet printer 100, as mentioned above. Further, the processing indicated by this flowchart can be applied similarly to the above-mentioned output correction processing described with reference to FIGS. 9A, 9B and FIGS. 10A, 10B. However, since the operation and description are substantially the same, the corresponding flowchart and its description are omitted.

First, at step S1 in FIG. 13, RGB image data (eight bits for each of R, G and B) is input from the application program 220. Control then proceeds to step S2, at which the input data is divided into pixel blocks each consisting of 2×2 pixels, by way of example. Next, at step S3, the above-described input correction tables b to e are applied to the pixels in each block in accordance with pixel positions in the block, respectively, to convert each item of pixel data (RGB data) of the pixel block to CMY values, as described earlier with reference to FIG. 7B.

Control then proceeds to step S4, at which the CMY values are converted to CMYK values. Next, at step S5, the output correction tables g to j are applied to each of the pixel values (CMYK values) of each block, as described above with reference to FIG. 10B, whereby the corrected output CMYK values (eight bits for each of C, M, Y and K) is obtained.

This is followed by step S6, at which the 8-bit corrected outputs C, M, Y, K are quantized as by the error diffusion method, thereby achieving a conversion to 1-bit data (print data) conforming to the tones printable by the ink-jet printer 100. Next, at step S7, the 1-bit data obtained by the conversion is output to the printer 100 and is printed thereby.

In the embodiment, the input correction tables and the output correction tables are provided in correspondence to pixel positions in a pixel block and are used to convert pixel data in accordance with each pixel position and pixel data in the pixel block, therefore they are generally called as "a conversion table" in the embodiment.

In the embodiment described above, the tone correction unit 302 of FIG. 2 receives an input of 8 bit data for each of C, M and Y and outputs 8-bit data for each of C, M, Y and K. However, there are instances where the number of tones in the tone correction unit 302 is reduced. For example, the color blue is obtained by mixing the colors of cyan and magenta. However, if cyan and magenta are mixed in equal proportions, the resulting blue takes on a violet tinge and it is therefore necessary to reduce the amount of magenta mixed in. Color presented on a display using RGB data and color printed on a printing medium using CMYK data will have a different tint.

This makes it necessary to perform the above-mentioned correction of color tone. Since the items of RGB data and CMYK data both are represented by finite discrete values, a decline in number of colors occurs owing to the correction of color tone. Such a decline in number of colors can be suppressed by adopting a method similar to that of the input or output correction.

The following method is conceivable as a method of suppressing the decline in number of tones in the tone correction unit 302.

FIG. 14 is a flowchart illustrating processing in the tone correction unit 302 according to another embodiment of the present invention.

First, at step S11 in FIG. 14, 8-bit data of each of the colors C, M, Y that have entered from the input correction unit 301 is converted to 16-bit data. This followed by step S12. Since error is initially "0", control proceeds directly from step S12 to step S13, where computation for correction of color tone is executed. The 16-bit data of each of the calculated colors C, M, Y, K is separated into integral and decimal parts and each part is made 8-bit data (step S14). At step S12 above, error that has occurred at step S14 is added to the pixel to be processed next. Step S14 is followed by step S15, at which it is determined whether the processing of all pixels has been completed. In order that the error developed at step S14 will be distributed to the pixels neighboring the pixel currently undergoing processing, the addition operation at step S12 is repeated until a "YES" decision is rendered at step S15.

Thus, a decline in the number of tones of the 8-bit data of each of C, M, Y can be prevented in the calculation for tone correction, which is for correcting for a difference in tint between color displayed on a screen by RGB data and color printed on a printing medium by CMYK data.

The present invention is described in regard to a printing apparatus particularly of the ink-jet printing type, in which the apparatus is equipped with means (e.g., an electrothermal transducer or laser beam mechanism) for generating thermal energy as the energy utilized to discharge ink, wherein a change in the state of the ink is brought about by this thermal energy. For example, effects similar to those described above are obtained with a piezoelectric-type ink-jet printing method of the kind described in the specification of Japanese Patent Publication No. 6-6357. High-density, high-definition printing can be achieved in accordance with this method.

With regard to a typical configuration and operating principle, it is preferred that the foregoing be achieved using the basic techniques disclosed in the specifications of U.S. Pat. Nos. 4,723,129 and 4,740,796. This scheme is applicable to both so-called on-demand-type and continuous-type apparatus. In the case of the on-demand type, at least one drive signal, which provides a sudden temperature rise that exceeds that for film boiling, is applied, in accordance with printing information, to an electrothermal transducer arranged to correspond to a sheet or fluid passageway holding a fluid (ink). As a result, thermal energy is produced in the electrothermal transducer to bring about film boiling on the thermal working surface of the ink-jet head. Accordingly, air bubbles can be formed in the fluid (ink) in one-to-one correspondence with the drive signals. Owing to growth and contraction of the air bubbles, the fluid (ink) is jetted via an orifice so as to form at least one droplet. If the drive signal has the form of a pulse, growth and contraction of the air bubbles can be made to take place rapidly and in appropriate fashion. This is preferred since it will be possible to achieve fluid (ink) discharge exhibiting excellent response.

Signals described in the specifications of U.S. Pat. Nos. 4,463,359 and 4,345,262 are suitable as drive pulses having this pulse shape. It should be noted that even better printing can be performed by employing the conditions described in the specification of U.S. Pat. No. 4,313,124, which discloses an invention relating to the rate of increase in the temperature of the abovementioned thermal working surface.

In addition to the combination of the orifice, fluid passageway and electrothermal transducer (in which the fluid passageway is linear or right-angled) disclosed as the construction of the print head in each of the above-mentioned specifications, an arrangement using the art described in the specifications of U.S. Pat. Nos. 4,558,333 and 4,459,600, which disclose elements disposed in an area in which the thermal working portion is curved, may be employed. Further, it is possible to adopt an arrangement based upon Japanese Patent Application Laid-Open No. 59-123670, which discloses a configuration having a common slot for the ink discharge portions of a plurality of electrothermal transducers, or Japanese Patent Application Laid-open No. 59-138461, which discloses a configuration having openings made to correspond to the ink discharge portions, wherein the openings absorb pressure waves of thermal energy.

As a print head of the full-line type having a length corresponding to the maximum width of the printing medium capable of being printed on by the printing apparatus, use can be made of an arrangement in which the length is satisfied by a combination of plural print heads of the kind disclosed in the foregoing specifications, or an arrangement in which print heads serve as a single integrally formed print head.

The print head may be of the replaceable tip-type, in which the electrical connection to the apparatus proper and the supply of ink from the apparatus proper can be achieved by mounting the head on the apparatus proper, or of the cartridge type, in which the print head itself is integrally provided with an ink tank.

In order to make the effects of printing much more stable, it is preferred that the printing apparatus of the present invention be additionally provided with print head recovery means and auxiliary means, etc. Specific examples are print head capping means, cleaning means, pressurizing or suction means, preheating means comprising an electrothermal transducer, a heating element separate from this transducer or a combination of the transducer and the heating element, and a pre-discharge mode for performing a discharge of ink separate from a discharge for printing. These expedients are effective in achieving stable printing.

A printing apparatus according to the present invention may take a variety of forms. It may be provided as an integral part of or separate from an information processing device such as a computer and serve as the image output terminal thereof, as a copier apparatus in combination with a reader or the like, or as a facsimile machine having sending and receiving functions.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the invention can be attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the functions of the above-described embodiments, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the above-described embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

The present invention is not limited to the above embodiments and various changes and modifications can be made within the spirit and scope of the present invention. Therefore, to apprise the public of the scope of the present invention, the following claims are made.

What is claimed is:

1. An image processing apparatus for processing multi-level image data, comprising:
   dividing means for dividing the multilevel image data into pixel blocks each comprising a plurality of pixels;
   conversion tables each containing a plurality of items of conversion data, each item corresponding to a pixel position in each pixel block obtained by division by said dividing means;
   conversion means for converting, by referring to said conversion tables, multi-level image data of a pixel of each pixel block obtained by division by said dividing means, into data corresponding to that pixel in the pixel block; and
   quantization means for quantizing the data corresponding to the pixel in the pixel block produced by said conversion means,
   wherein each item of the conversion data of each of said conversion tables has been set in such a manner that an average value of the data corresponding to the pixel in the pixel block converted by said conversion means, takes on a value that is based on the multilevel image data within the block.

2. The apparatus according to claim 1, wherein each item of the conversion data is data for converting luminance data to density data.

3. The apparatus according to claim 1, wherein each item of the conversion data is data for converting density data in accordance with image formation characteristics of an image forming apparatus that forms an image based upon the data converted by said conversion means.

4. The apparatus according to claim 1, wherein the conversion tables output the data upon having the multilevel image data input thereto, and wherein the data differs depending upon the position even if the multilevel image data is same.

5. An image processing method for processing multilevel image data, comprising:
   a dividing step, of dividing the multilevel image data into pixel blocks each comprising a plurality of pixels;
   a conversion step, of converting multilevel image data of a pixel of each pixel block obtained by division, by referring to conversion tables having a plurality of items of conversion data, each corresponding to each pixel position in each pixel block obtained by division in said dividing step, into data corresponding to that pixel in the block; and
   a quantizing step, of quantizing the data corresponding to the pixel in the pixel block produced in said conversion step,
   wherein each item of the conversion data of each of the conversion tables has been set in such a manner that an average value of the data corresponding to pixel in the pixel block converted in said conversion step, takes on a value that is based on corresponding multi-level image data within the pixel block.

6. The method according to claim 5, wherein each item of the conversion data is data for converting luminance data to density data.

7. The method according to claim 5, wherein each item of the conversion data is data for converting density data in accordance with image formation characteristics of an image forming apparatus that forms an image based upon the data converted in said conversion step.

8. The method according to claim 5, wherein the conversion tables output the data upon having the multilevel image data input thereto as an address, and wherein the data differs depending upon the position even if the address is the same.

9. A computer-readable storage medium storing a control program for executing the image processing set forth in claim 5.

10. A printing control apparatus to which multilevel image data is input for generating printing data to control an image printing apparatus, comprising:
    dividing means for dividing the multilevel image data into pixel blocks each comprising a plurality of pixels;
    conversion tables having a plurality of items of conversion data, each item corresponding to a pixel position in each pixel block obtained by division by said dividing means;
    conversion means for converting, by referring to said conversion tables, multilevel image data of a pixel of each pixel block obtained by division by said dividing means, into data corresponding to that pixel in the pixel block; and
    print-data generating means for generating print data, which is for being printed by said image printing apparatus, based upon the data converted by said conversion means, said print-data generating means including quantization means for quantizing the data corresponding to pixel in the pixel in the pixel block produced by said conversion means,
    wherein each item of the conversion data of each of said conversion tables has been set in such a manner that an average value of the data corresponding to the pixel in the pixel block converted by said conversion means, takes on a value that is based on the multilevel image data within the pixel block.

11. The apparatus according to claim 10, wherein each item of the conversion data is data for converting luminance data to density data.

12. The apparatus according to claim 10, wherein each item of the conversion data is data for converting density data in accordance with image formation characteristics of an image forming apparatus that forms an image based upon the data corresponding to pixel data converted by said conversion means.

13. The apparatus according to claim 10, wherein the conversion tables output the data upon having the multilevel image data input thereto, and wherein the data differs depending upon the position even if the multilevel image data are the same.

14. A printing control method for inputting multilevel image data and generating print data to control an image printing apparatus, comprising:
    a dividing step, of dividing the multilevel image data into pixel blocks each comprising a plurality of pixels;
    a conversion step, of converting multilevel image data of a pixel of each pixel block obtained by division, by referring to conversion tables having a plurality of items of conversion data, each corresponding to each pixel position in each pixel block obtained by division in said dividing step, into data corresponding to that pixel in a pixel block; and
    a print-data generating step, of generating print data, which is for being printed by said image printing apparatus, based upon the data produced in said conversion step, said print-data generating step including a quantization step of quantizing the data corresponding to the pixel in the pixel block produced in said conversion step, wherein each item of the conversion data of each of the conversion tables has been set in such a manner that an average value of the data corresponding to the pixel in the pixel block converted in said conversion step, takes on a value that is based on multilevel image data within the pixel block.

15. The method according to claim 14, wherein each item of the conversion data is data for converting luminance data to density data.

16. The method according to claim 14, wherein each item of the conversion data is data for converting density data in accordance with image formation characteristics of an image forming apparatus that forms an image based upon the data produced in said conversion step.

17. The method according to claim 14, wherein the conversion tables output the data having the multilevel image data input thereto as an address, and wherein the data differs depending upon the position even if the address is the same.

18. A computer-readable storage medium storing a control program for executing the recording control method set forth in claim 14.

19. A printer driver to which multilevel image data is input for generating print data, comprising:
- a module of a dividing step of dividing the multilevel image data into pixel blocks each comprising a plurality of pixels;
- a module of a conversion step of converting multilevel image data of a pixel of each pixel block obtained by division, by referring to conversion tables having a plurality of items of conversion data, each corresponding to each pixel position in each pixel block obtained by division by said module of the dividing step; and
- a module of a print-data generating step of generating print data, which is for being printed by the image printing apparatus, based upon the data produced by said module of the conversion step, the print-data generating step including a quantization step of quantizing the data corresponding to pixel in the pixel block produced by said module of the converting step, wherein each item of the conversion data of each of the conversion tables has been set in such a manner that an average value of the data corresponding to the pixel in the pixel block converted by the module of the conversion step, takes on a value that is based on the multilevel image data within the pixel block.

20. The printer driver according to claim 19, wherein each item of the conversion data is data for converting luminance data to density data.

21. The printer driver according to claim 19, wherein each item of the conversion data is data for converting density data in accordance with image formation characteristics of an image forming apparatus that forms an image based upon the data converted by the module of the conversion step.

22. The printer driver according to claim 19, wherein the conversion tables output the data upon having the multilevel image data input thereto as an address, and wherein the data differs depending upon the position even if the address is the same.

23. A computer-readable storage medium storing software for performing the functions of the printer driver set forth in claim 19.

* * * * *

UNITED STATES PATENT AND TRADEMARK OFFICE
CERTIFICATE OF CORRECTION

PATENT NO. : 7,075,679 B2
APPLICATION NO. : 09/988423
DATED : July 11, 2006
INVENTOR(S) : Fumihiro Goto et al.

It is certified that error appears in the above-identified patent and that said Letters Patent is hereby corrected as shown below:

COLUMN 8

Line 52, "This" should read --This is--.

COLUMN 9

Line 45, "abovementioned" should read --above-mentioned--.

COLUMN 11

Line 38, "is" should read --are the--.

COLUMN 12

Line 27, "to pixel" should read --to the pixel--.

COLUMN 14

Line 6, "to pixel" should read --to the pixel--.

Signed and Sealed this

Thirtieth Day of January, 2007

JON W. DUDAS
*Director of the United States Patent and Trademark Office*